June 24, 1958  L. M. AUSTIN  2,839,871
GLASS ROD AND TUBE CUTTING MECHANISM
Filed May 26, 1955  2 Sheets-Sheet 1

INVENTOR
LEWIS M. AUSTIN
BY
ATTORNEYS

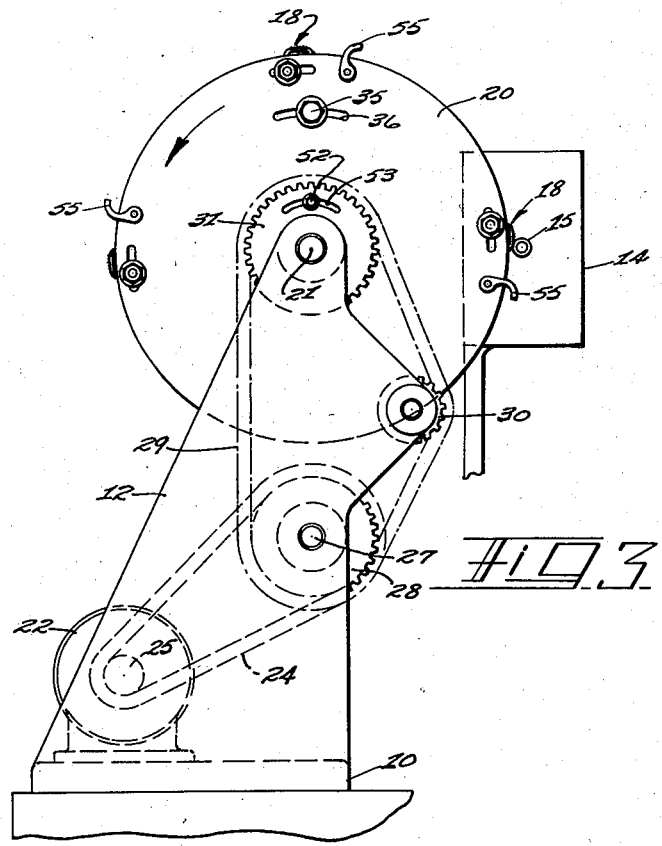
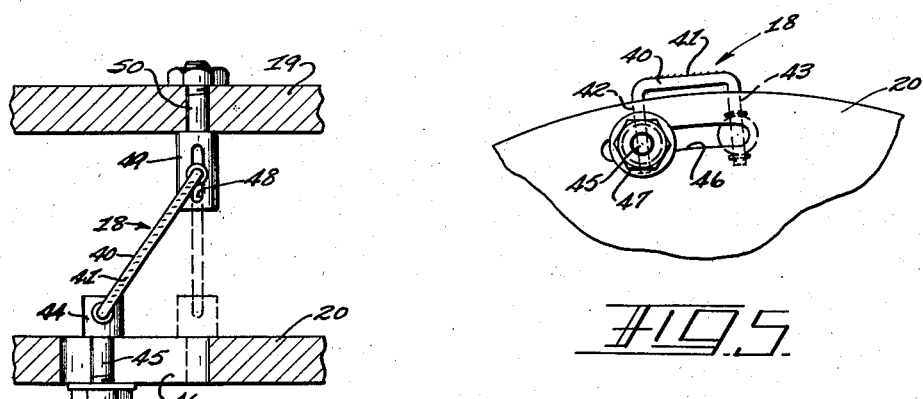

United States Patent Office 2,839,871
Patented June 24, 1958

2,839,871

GLASS ROD AND TUBE CUTTING MECHANISM

Lewis M. Austin, Toledo, Ohio, assignor to Owens-Illinois Glass Company, a corporation of Ohio Application May 26, 1955, Serial No. 511,238

11 Claims. (Cl. 49—48)

My invention relates to apparatus for severing rods into individual pieces of a desired length. The invention is of special utility in the manufacture of glass rods or tubes and is herein illustrated and described as adapted for such purpose although not so limited.

In the manufacture of glass tubes and rods it is common practice to draw the molten glass from a furnace through a forming device by which the rod or tube is shaped. The tube or cane is drawn horizontally forward continuously and is quickly cooled and hardened as it advances. Individual pieces of any desired length are severed from the forward end of the advancing rod or tube.

The present invention relates particularly to means for severing the glass into individual pieces of any desired length. The severing is effected by first scoring the glass, then breaking it off at the score. The cutters or scoring devices which extend transversely to the direction of travel of the glass are periodically moved into engagement with the glass. Each scoring device is moved in the direction of its length for scoring the glass. As the glass is moving forward in the direction of its length during this scoring operation, the invention provides means for advancing the point or line of contact of the scoring device as the glass advances.

In the preferred form of the invention as illustrated the scoring knives are mounted on the periphery of a carrier rotating about a horizontal axis parallel with the advancing glass rod or tube. The scoring blades are mounted on their carrier at an angle such that the point of contact with the glass advances with the glass during the scoring operation. The rotary carrier for the scoring knives may be driven by a motor connected to operate in synchronism with the motor by which the glass is drawn forward. The relative speeds of the motors may be adjustably varied by suitably speed changing means for cutting rods or tubes of different lengths. The angle of the cutters is also adjustable to correspond with the variations in speed.

An object of the invention is to provide an apparatus particularly adapted for severing glass cane or tubing of small diameter into individual pieces. The glass is drawn at a high speed, requiring substantial forward movement of the scoring blades during the scoring operation.

The terms cutting and scoring are herein used interchangeably, the operation of severing a length of glass consisting in first scoring or cutting the glass at one side thereof and then severing or breaking off the glass at the score line. The term glass rod is used to apply to the glass whether in the form of a solid rod or cane or in tubular form.

Referring to the accompanying drawings:

Fig. 3 is an end elevation of the apparatus;

Fig. 4 is a fragmentary part sectional plan view of a scoring device and its mounting; and Fig. 5 is an elevational view of the same.

Figure 1:
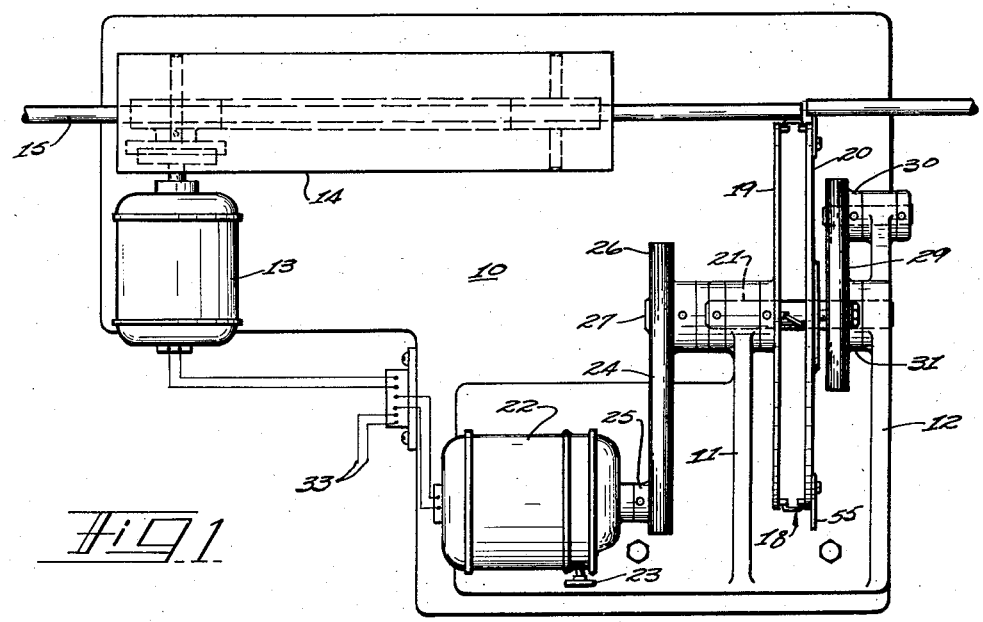
Fig. 1 is a plan view of mechanism for severing glass rods in accordance with the present invention.
Figure 2:
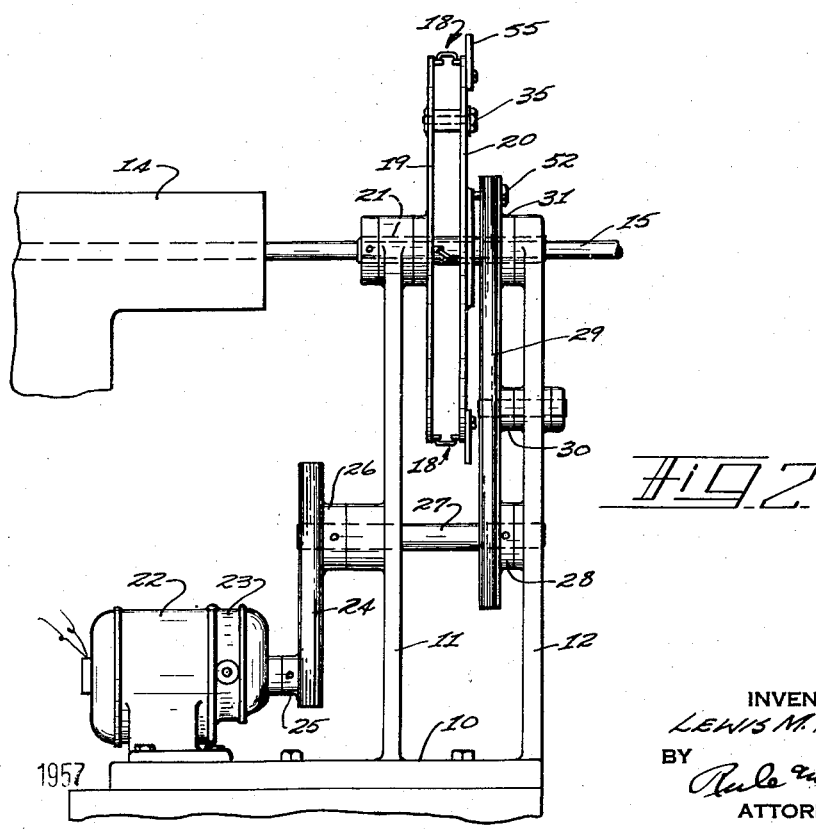
Fig. 2 is an elevational view of the same, parts being broken away.

The apparatus is mounted on a stationary base 10 from which rise two vertical standards 11 and 12. A motor 13 mounted on the base 10 is operatively connected to continuously drive a caterpillar drawing device 14 by which the glass rod or cane 15 is continuously drawn forward horizontally in the direction of its length. The rod 15 may be either a solid rod or a tube.

Glass cutters or scoring devices 18 are mounted on a carrier comprising a pair of parallel disks 19, 20. These disks are mounted on a horizontal shaft 21 parallel with the rod 15. The carrier 19, 20 is rotated continuously by a motor 22 which has driving connection with the shaft 21 through gearing including a speed changing device 23, a sprocket chain 24 trained over a gear 25 keyed to the shaft of the speed changer 23 and a sprocket wheel 26 keyed to a shaft 27. A second sprocket wheel 28 on the shaft 27 drives a chain 29 trained over the sprocket wheel 28, an idler sprocket 30 and a sprocket wheel 31 on the shaft 21. The motors 13 and 22 are driven in synchronism by alternating current supplied through the mains 33.

The disk 19 is keyed to the shaft 21. The disk 20 is mounted for rotative adjustment relative to the disk 19 for changing the angular positions of the cutters as hereinafter described. The two disks 19 and 20 are locked together by a clamping bolt 35 attached to the disk 19 and extending through a slot 36 in the disk 20. By loosening the nut on the bolt the disk 20 may be adjustably rotated and then clamped in its adjusted position by tightening the nut.

The scoring devices 18 are equally spaced circumferentially of the carrier disks 19, 20, any desired number of such scoring devices being provided. Each scoring device comprises a scoring knife or blade 40 consisting of Carboloy or the like and formed with saw teeth 41. The blade is formed with extensions 42, 43 for connection with the carrier disks 20 and 19. The extension 42 has a swivel connection with a head 44 of a clamping bolt 45 which extends through an elongated slot 46 in the disk 20. The bolt 45 is movable along the slot for adjusting the angular position of the cutter blade, the bolt being clamped in adjusted position by a nut 47. The end portion 43 of the blade extends through a slot 48 formed in a head 49 of a clamping bolt 50 mounted in a disk 19. This construction permits the angular position of the cutter blade to be adjusted from the broken line position (Fig. 4), in which the blade is perpendicular to the disks 19, 20, to any required angle. The cutter blades can be adjused individually and also all may be adjusted simultaneously by the rotation of the disk 20 relative to the disk 19, permitted by the adjusting means 35, 36 as above described.

The sprocket gear 31 (Fig. 3) has a driving connection with the disk 20 provided by a bolt 52 attached to the hub of the disk 20 and extending through a slot 53 in the gear 31. By loosening the clamping nut on the bolt 52 the disk 20 is free for rotative adjustment while the driving gear is at rest.

Knock-off devices 55, individual to the scoring knives, are mounted on the disk 20, a short distance behind the knives. These devices as shown are in the form of curved arms protruding beyond the periphery of the disk into the path of the rod 15, in position to engage the rod immediately after it has been scored by the scoring knife, thereby bending the rod and placing it under strain by which it is broken off at the score.

The operation may be summarized as follows: The rod 15 (either a tube or solid cane) is drawn rapidly forward in the direction of its length by the motor 13 operating through the caterpillar drive 14. At the same time the disks 19, 20 carrying the scoring knives are rotated by the motor 22 synchronized with the motor 13. The scoring knives operate in succession to score the rod 15. During the scoring operation the knives are moving in a direction perpendicular to that of the rod but are adjusted at such an angle that the point of contact between the rod and the knife advances with the rod and at the same speed the rod is advancing, so that there is no relative movement lengthwise of the rod during this scoring operation. Immediately after the rod is scored it is engaged by a knock-off arm 55 which bends the rod and snaps it off at the score line.

The length of the individual sections or rods which are being severed can be adjusted by means of the speed changing device 23. Also the number of scoring devices can be changed for correspondingly adjusting the length of the severed rods. Thus in the particular construction illustrated there are four scoring devices mounted on the carrier disks 19, 20. By removing two of these, for example, the length of the severed rods will be doubled. Any desired number of scoring devices may be mounted on the disks.

Modifications may be resorted to within the spirit and scope of my invention.

I claim:

1. Apparatus for severing a rod into individual lengths, comprising means for advancing the rod in the direction of its length, a scoring blade having a scoring edge, a carrier on which the blade is mounted, means for rotating the carrier about an axis parallel with the said rod and thereby bringing the scoring edge into contact with the rod and moving the blade while the scoring edge is in contact with the rod in a direction substantially perpendicular to that of the rod while in contact therewith, said scoring edge being at an angle to its direction of movement such that its point of contact with the rod advances with and at the same speed as the rod, the rotary movement of the scoring blade with its carrier being in a path to maintain the point of contact with the rod substantially constant throughout the movement in contact with the rod, thereby scoring the surface of the rod at said point of contact, and means for breaking the rod at the score as the score advances beyond the scoring blade.

2. Apparatus for severing a glass rod into individual lengths, comprising means for continuously drawing the rod horizontally in the direction of its length, a scoring blade, a carrier on which the blade is mounted, means for rotating the carrier about an axis parallel with said rod and thereby bringing the scoring edge of the blade in contact with the rod and advancing said edge lengthwise while in contact with the rod, said edge being substantially in a plane tangent to the rod at the point of contact throughout the movement of said edge in contact with the rod, the blade being arranged at an angle to the direction of its movement while in contact with the rod and thereby causing the point of contact of the blade with the rod to advance with the rod while in contact therewith.

3. The apparatus defined in claim 2 including means for adjustably varying the relative speed of the rod and scoring blade, and means for adjusting the angle of said blade to correspond with the said relative speed.

4. Apparatus for severing a glass rod into individual sections comprising means for advancing the rod in the direction of its length, a plurality of units each comprising a scoring blade with a scoring edge, a circular carrier on which said units are mounted, means for rotating the carrier about its axis and bringing the scoring edges in succession into contact with the rod, said axis being parallel with the rod, the scoring edges being positioned at the periphery of the carrier and each extended at an angle to its direction of movement with the carrier and in a direction to substantially maintain surface contact only with the rod, the angle being such that while the blade is in contact with the rod the point of contact advances with the rod as the blade advances transversely of the rod, whereby the rod is scored at said point of contact, and means on the carrier for severing the rod at the score.

5. The apparatus defined in claim 4, the carrier comprising parallel disks spaced apart and means providing slidable connections between each said blade and the said disks permitting angular adjustment of the blade relative to the disks.

6. Apparatus for severing a glass rod into a plurality of separate rods, including a blade, a carrier on which the blade is mounted, said carrier including plates spaced apart and means providing connections between the respective plates and the opposite ends of the blade, said connecting means including a bolt attached to one of said plates and to which one end of the blade is pivotally connected, said bolt being adjustable along said plate for adjusting the angle of said blade, and means providing a pivotal connection between the other end of the blade and the other plate.

7. The apparatus defined in claim 6, the last mentioned means comprising a bolt clamped to the plate and having a head formed with a slot therein extending transversely of the plate, the blade having a slidable connection with said slot.

8. Apparatus for severing a glass rod into lengths, including a plurality of severing units, a carrier on which said units are mounted, said carrier comprising parallel disks mounted for rotation about their axis and spaced apart, the severing units being mounted adjacent to the periphery of the disks and uniformly spaced circumferentially of the disks, each said severing unit comprising bolts mounted in the disks and providing connections between the blade and the disks, one said bolt being adjustable circumferentially of the disk, and means providing a slot and pin connection between the other bolt and the blade permitting movement of the end of the blade toward and from the disk to which it is connected.

9. Apparatus for severing a glass rod into lengths comprising a scoring blade, parallel supporting plates spaced apart and means for providing adjustable connections between the plates and the opposite ends of the blade, including a bolt mounted in one said plate and having a head formed with a slot extending perpendicular to the plate, one end of the blade having a swivel and sliding connection with said slot, a second bolt mounted in the other said plate and formed with a slot extending substantially perpendicular to said first mentioned slot and in which said second bolt is slidably adjustable, the blade having a swivel connection with the head of the second bolt.

10. Apparatus for severing a rod into individual pieces, said apparatus comprising means for advancing the rod in the direction of its length, a plurality of severing units, a carrier on which said units are mounted, said carrier comprising parallel disks spaced apart and mounted for rotation about a common axis parallel with the said rod, said severing units each comprising a scoring blade extending between said disks and operatively connected at its ends with the respective disks, one of said disks being adjustably rotatable relative to the other about its axis, and means for locking the disks in their adjusted relative positions, the blades having slidable connections with the disks by which the angles of the blades are adjustably varied by the said relative adjustment of the disks, the blades being positioned to be brought into contact with the rod by the rotation of the carrier and thereby score the rod.

11. The apparatus defined in claim 10 and in combination therewith, knock-off arms individual to the severing units and positioned to engage the rod after each scoring operation and thereby apply to the rod a force by which the rod is severed at the score line.

(References on following page)

References Cited in the file of this patent

UNITED STATES PATENTS

| | | |
|---|---|---|
| 1,143,285 | Koella | June 15, 1915 |
| 1,510,729 | Weisner | Oct. 7, 1924 |
| 1,851,334 | Stein et al. | Mar. 29, 1932 |
| 1,987,409 | Moore | Jan. 8, 1933 |
| 2,184,452 | Grunert | Dec. 26, 1939 |
| 2,550,146 | Gillich et al. | Apr. 24, 1951 |

FOREIGN PATENTS

| | | |
|---|---|---|
| 947,397 | France | Jan. 10, 1949 |
| 652,561 | Great Britain | Apr. 25, 1951 |